Aug. 28, 1956   R. W. KLING   2,760,816
LOAD HAULING TRAILER STRUCTURE
Filed Dec. 13, 1954   5 Sheets-Sheet 1

INVENTOR.
Robert W. Kling
BY
Attorney

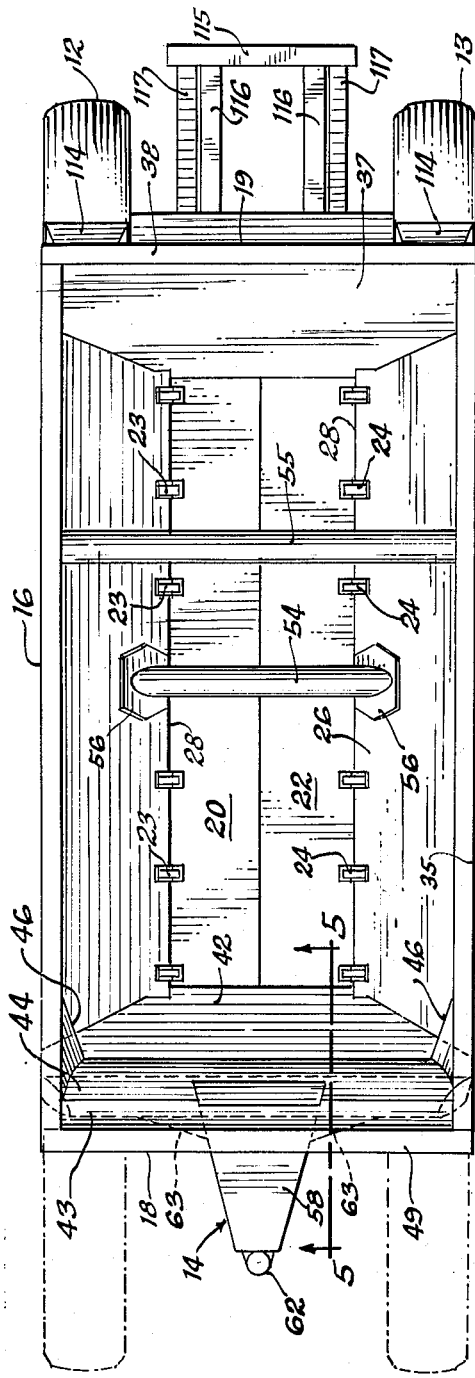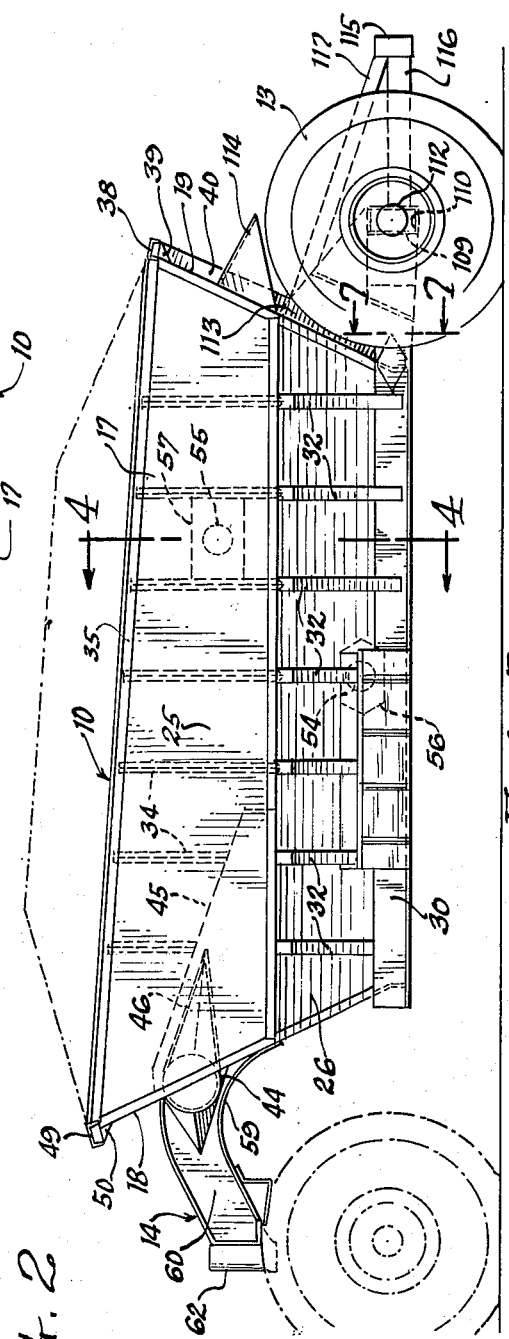

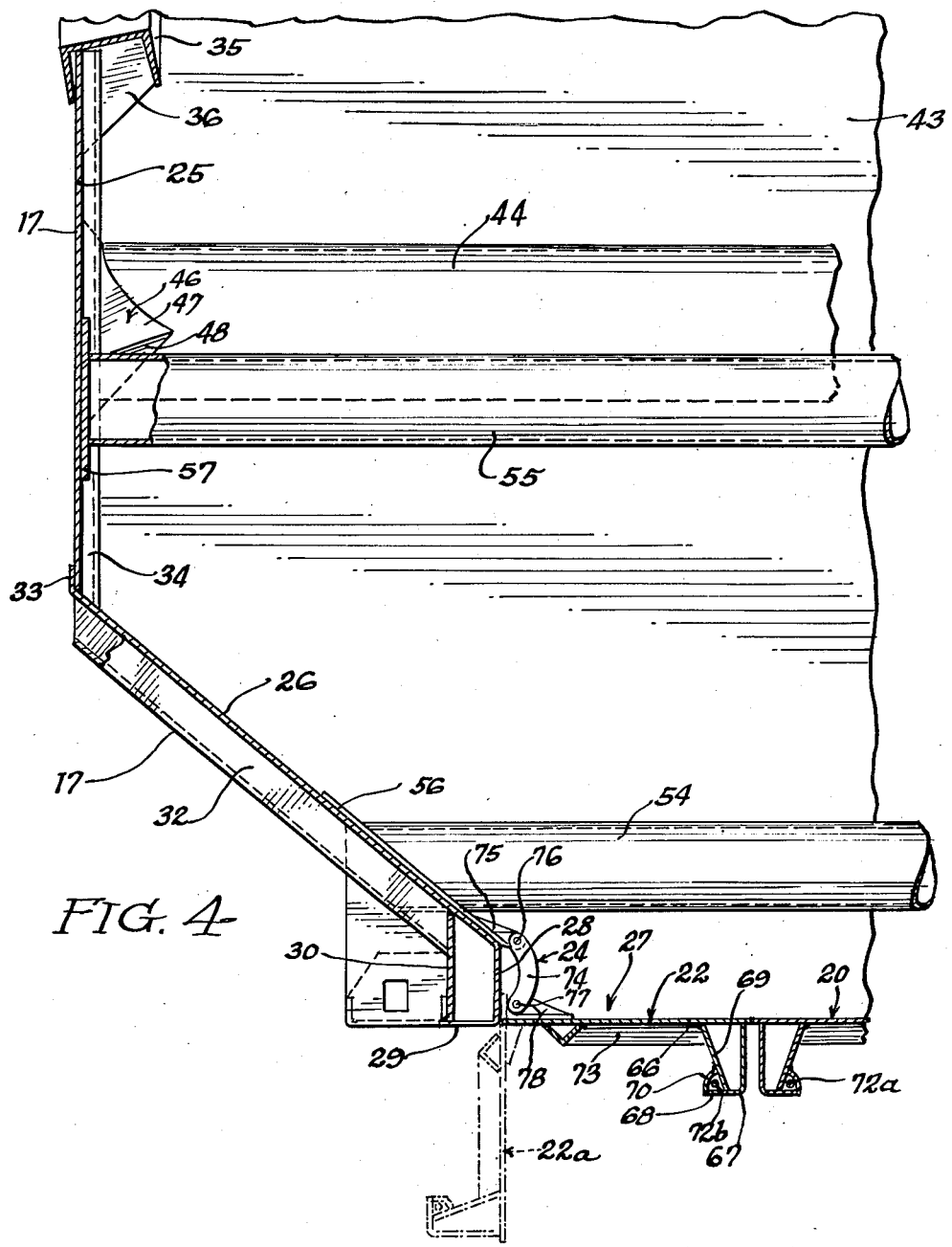

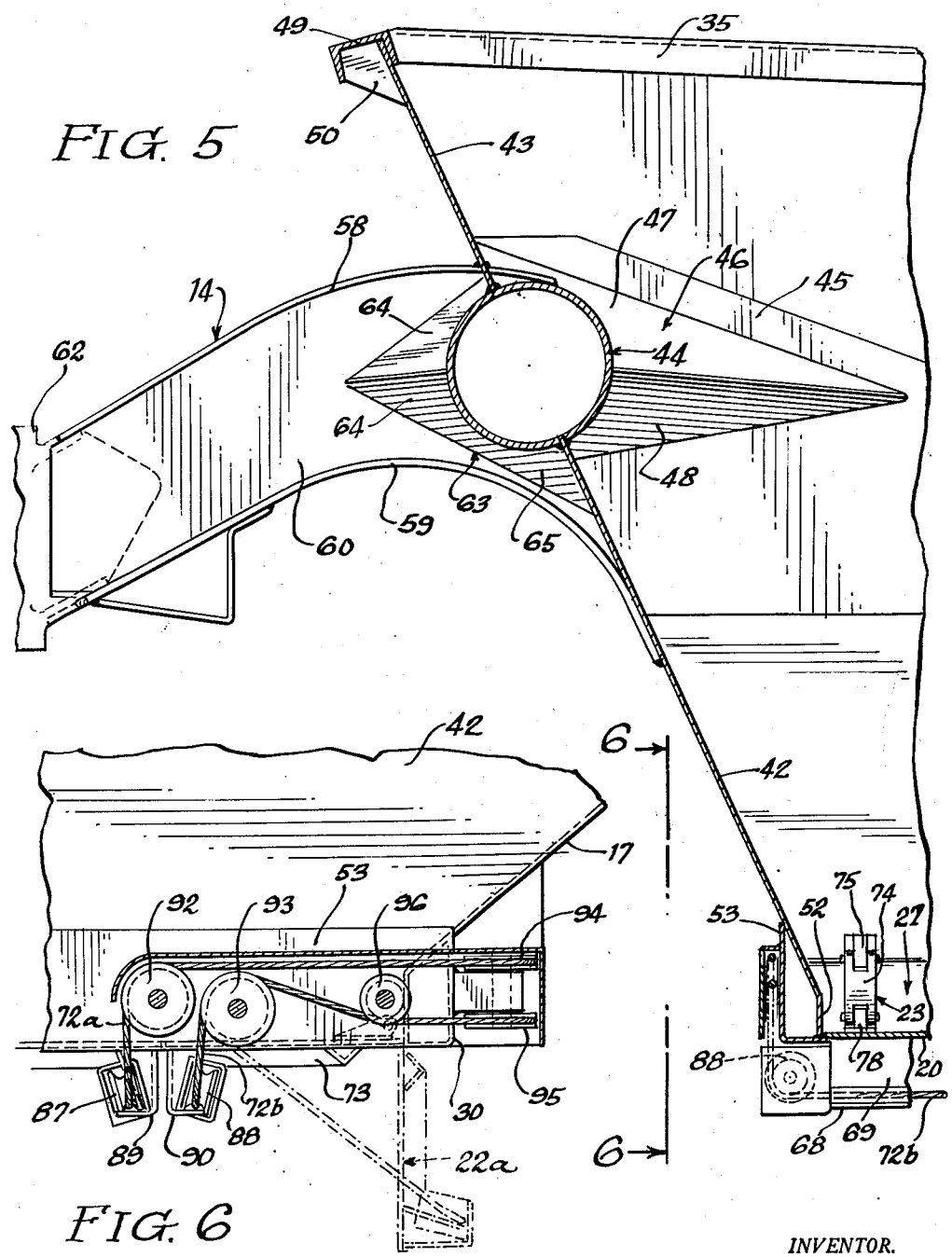

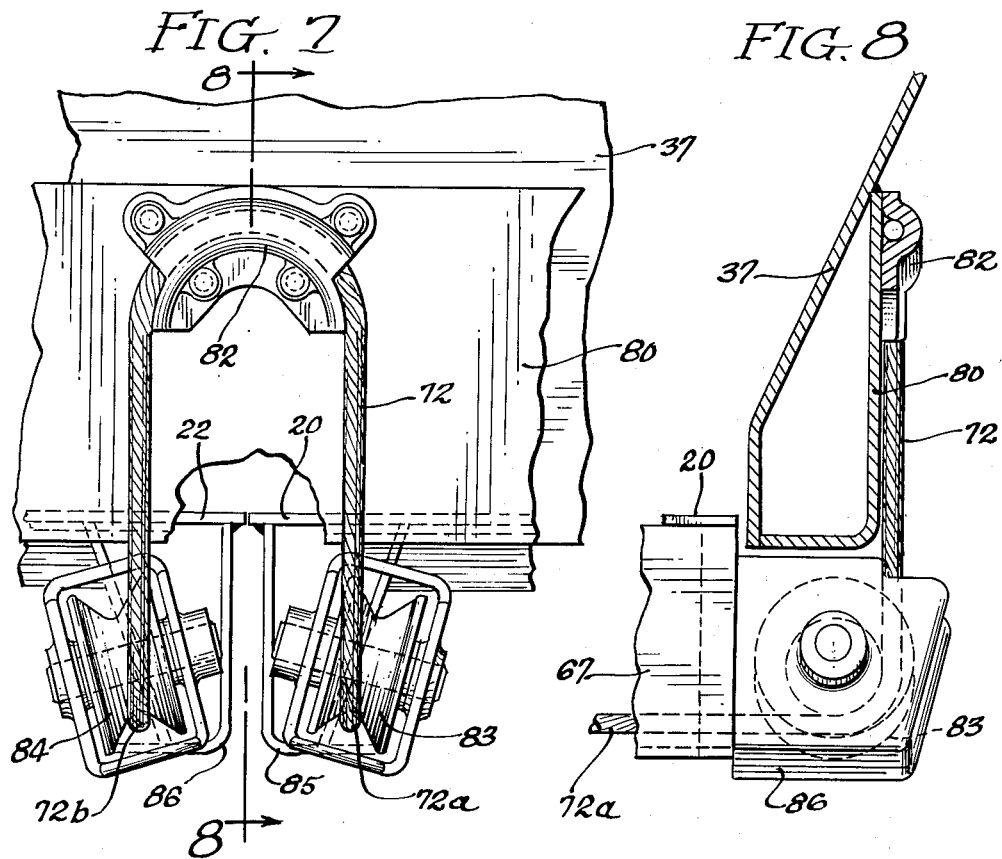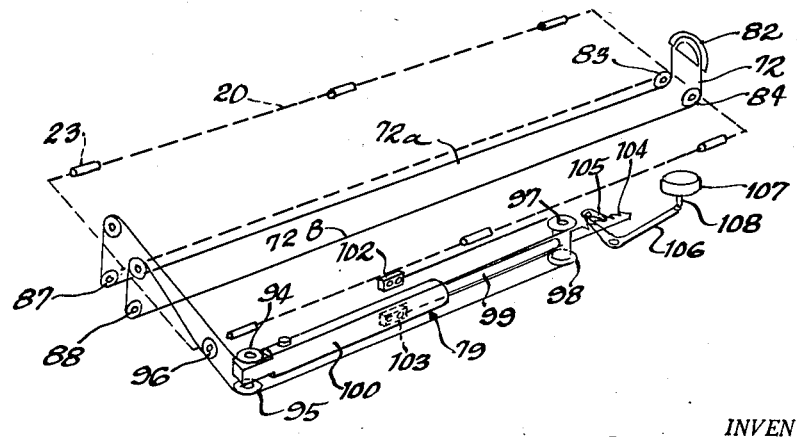

2,760,816

LOAD HAULING TRAILER STRUCTURE

Robert W. Kling, Wilmette, Ill., assignor to Athey Products Corporation, Chicago, Ill., a corporation of Illinois Application December 13, 1954, Serial No. 474,916

14 Claims. (Cl. 298—29)

This invention relates to a load hauling trailer structure, and more particularly to such a structure having a hopper body which is substantially frameless and has large effective load carrying capacity in comparison to its weight.

One of the objects of my invention is to provide a structure for a substantially frameless two-wheel trailer of rugged construction and large capacity and which has the draft and supporting connections made directly to the body.

As another object, this invention comprehends the provision of a trailer structure of the type described and which is adapted to be dumped at the bottom.

My invention further has within its purview the provision of a rugged and substantially frameless trailer having a draft connection adapted to the distribution of the forces encountered to various parts of the body, as well as to imparting rigidity to the body structure.

As another object, the invention contemplates the provision of a trailer structure of the type to which reference has been made and which decreases in depth rearwardly of the body to effect desirable weight distribution on the driving wheels.

It is another object of my invention to provide a simple, rugged and dependable mechanism for effecting operation of the bottom dumping doors for a trailer of the type described.

These and other objects of this invention will become apparent from the following detailed description when taken together with the accompanying drawings in which:

Fig. 2 is a top plan view of the trailer structure shown in Fig. 1, wherein the positions of the wheels of the tractor with which the trailer is utilized are indicated in dot-and-dash lines;

Fig. 3 is a side elevational view of the trailer wherein the outline of a load for the trailer body, as well as the positions of the tractor wheels, are indicated in dot-and-dash lines;

Fig. 4 is a fragmentary end sectional view taken substantially on a line 4—4 of Fig. 3 and in the direction of arrows, Fig. 4 being drawn to a larger scale than Fig. 3;

Fig. 5 is a fragmentary side sectional view wherein the section is taken substantially as indicated by a line 5—5 in Fig. 2 and accompanying arrows, Fig. 5 being drawn to a larger scale than Fig. 2;

Fig. 6 is a fragmentary front elevational view taken substantially at a position indicated by a line 6—6 in Fig. 5 and by accompanying arrows, portions of the view being illustrated in section to show internal structural details, and alternative positions of parts being shown in dot and dash lines;

Fig. 7 is a fragmentary rear sectional view taken substantially at a position indicated by a line 7—7 and accompanying arrows in Fig. 3;

Fig. 8 is a fragmentary sectional view taken substantially on a line 8—8 of Fig. 7 and in the direction indicated by arrows; and Fig. 9 is a diagrammatic view illustrating the mechanism utilized for effecting operation of bottom dumping doors in the disclosed trailer structure.

Figure 1:
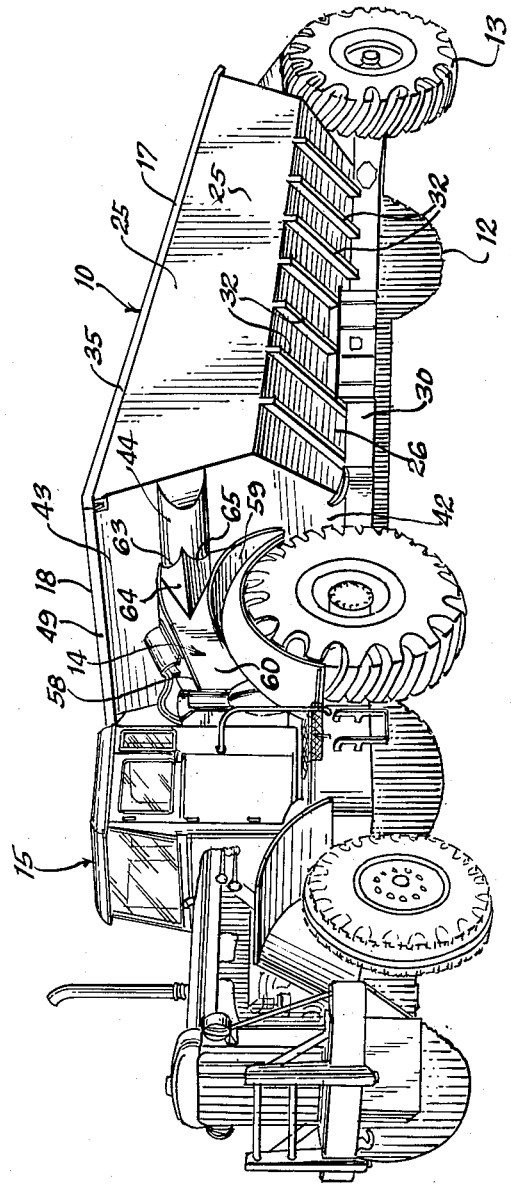
Fig. 1 is a perspective view of a preferred embodiment of my load hauling trailer, showing that trailer in an operative association with a four-wheel tractor.

Considered generally, the exemplary embodiment of my invention which is shown herein for illustrative purposes, and particularly as depicted in Fig. 1, include a hopper type body 10 supported at its rear end by wheels 12 and 13 and having a gooseneck connecting structure 14 which projects forwardly from the front end of the body and is adapted to afford a supporting and draft connection to the rear end of a four-wheel tractor 15. The connection between the tractor and the gooseneck is made through a swivel mechanism which provides for three degrees of relative movement between the tractor and the trailer. That is, the tractor and trailer may swing laterally relative to one another, the trailer may rock transversely with respect to the tractor, and the trailer and tractor may move angularly with respect to one another in a vertical direction. Thus, in addition to having the required flexibility for turning corners, there is sufficient flexibility in the connection to allow for the unevenness of terrain over which the vehicle may be required to move.

It being among the objects of this invention to provide a trailer structure having a hopper type body with a capacity for carrying very large loads, and also to provide a structure in which the ratio of the capacity load weight to the trailer weight is high, an underframe, as such, has been eliminated, and the load retaining parts of the body are called upon largely to afford the required load carrying strength.

In the disclosed structure, and as depicted in Figs. 1, 2 and 3, the body 10 has opposed and similarly constructed side walls 16 and 17 welded at their opposite ends to front and rear end walls 18 and 19 respectively to form a hopper which is open at the top and generally rectangular as viewed from the top. At the bottom, doors 20 and 22 are connected through hinge devices 23 and 24 to the bottom edges of the side walls 16 and 17 respectively and are swingable vertically in reference to the respective side walls between open and closed positions, as depicted in Fig. 4; the closed positions of the doors being indicated in solid lines at 20 and 22, and the open position of the door 22 being illustrated in dot and dash lines at 22a. The doors 20 and 22 are of sizes such that when closed, they form a bottom for the hopper type body with the joint between the doors extending longitudinally along the mid-portion. Also, with the trailer normally supported on relatively level terrain, the doors 20 and 22 may swing downwardly to relatively vertical positions below their hinged connections to the body side walls for dumping purposes.

The side walls 16 and 17, as previously mentioned, are similarly constructed with their parts in opposed relationship. Thus, for the purposes of this disclosure, the description of the details of the structure of the side wall 17, which is more fully illustrated in its various detailed aspects in the accompanying drawings, will suffice for conveying the essentials of structure of both of the side walls 16 and 17.

As depicted in Figs. 1 to 4 inclusive, the side wall 17 includes an upper and substantially vertical plate 25 and a lower plate 26 which slopes inwardly of the body in obtuse angular relationship to the side plates 25 and extends to a side edge of a bottom opening 27 which is closed during carrying operations by the doors 20 and 22. The angular disposition of the lower plate 26 is such that materials carried in the body, particularly free running and non-sticky materials, will flow readily from the interior of the body during dumping. Along its bottom margin, the lower plate of the disclosed structure is bent to provide a substantially vertical portion 28 extending longitudinally of the body adjacent to and defining one side of the bottom opening 27. A second bend in the lower margin of the plate 26 provides an outwardly projecting bottom flange 29 which extends along the bottom of the vertical portion 28. A plate 30 in spaced, longitudinally parallel and opposed relationship to the vertical portion 28 extends vertically from the outer margin of the flange 29 to the lower surface of the plate 26 above the vertical portion 28, and is welded in place to the surface of the plate 26 and the flange 29 to provide a reinforcement of boxlike section along the bottom of the side wall adjacent the bottom opening 27.

At spaced positions longitudinal of the exterior surface of the sloping side plate 26, channels 32 are secured, as by welding, to the plate 26 and extend in substantially vertical planes along the exterior of the plate 26 from the plate 30 to the juncture of the plate 26 with the vertically disposed upper side plate 25. These channels are placed with the web to the outside, so that each provides a reinforcing rib of boxlike section on the sloping portion of the side wall. It may be observed by reference to Fig. 3 that the upper edge of the sloping side plate 26 is substantially parallel to the bottom of the body and that the bottom of the body is normally practically horizontal or parallel to the ground surface when the trailer is in position for use. It may further be observed, however, that in my disclosed trailer body structure, the upper side plate 25 is higher at the front portion of the body than at the rear, so that the body gradually becomes somewhat shallower at the rear end than it is at the front end. This variation of body depth accomplishes a desired distribution of the weight of the loaded trailer body from front to rear to afford a desirable increase of the weight carried on the driving wheels of the tractor without disturbing the normally level or horizontal position of the bottom of the body which is desirable for dumping and the downward swinging movements of the bottom doors.

As depicted in Fig. 4, the upper margin of the sloping lower plate 26 is bent to provide a flange 33 which overlaps a marginal portion of the upper plate 25, the upper and lower plates 25 and 26 being welded together along the joint provided by the overlapping margins to secure the plates together. Internally of the upper plate 25 and in substantial alignment with the channels 32, angle strips 34 are welded to the side plate 25 and extend from the juncture of the upper and lower plates to the top of the upper side plate 25 to provide vertically extending reinforcing ribs of hollow section for the upper plate 25. Along the top edge of the upper side plate 25 a channel 35 is secured to the exterior surface of the side plate by a welded seam and is additionally supported relative thereto at spaced positions by gusset plates 36. The channel 35 opens downwardly and overlaps a top marginal portion of the upper side plate 25 and extends into the open top of the body from the side plate surface. This channel adds longitudinal rigidity to the body side plate structure.

The rear end wall 19 is formed by a plate 37 which conforms at its opposite ends to the configuration established by the upper and lower side wall plates 25 and 26, the opposite ends of the rear end wall 37 being welded to the side wall plates to provide corner joints. The end wall plate 37 is disposed at a relatively steep angle with reference to the horizontal or bottom plane of the body, but slopes outwardly toward the top to increase the body load carrying capacity without interference with the effective dumping of the body through the bottom opening. A channel 38 is secured to the top of the end plate 37 and extends along that top edge of the end plate from one side to the other of the body, and in addition to being welded to the top margin of the end plate, it is also welded to the channels 35 at the tops of the side walls. As in the instance of the channels at the tops of the side walls, the channel 38 on the rear end wall projects outwardly from the top surface of that wall with the channel opening downwardly, and gusset plates 39 are utilized to reinforce the attachment of the channels to the end wall. Also, channels 40 are secured to the exterior surface of the end wall at spaced positions and extend vertically of that end wall from top to bottom to provide vertical reinforcing ribs of boxlike section.

Because of the connection of the gooseneck supporting and draft structure 14 to the front end wall, that wall is somewhat different in construction from the rear end wall. It includes a lower plate portion 42 conforming at its opposite ends to the configuration established by the sloping lower side wall plates and to a portion of the upper side wall plates, and is welded to those plates to provide corner seams. Also, an upper end wall plate 43 is utilized which extends between the top portions of the side walls and has an upper edge in substantially flush relationship to the tops of the upper side wall plates. The lower and upper plates 42 and 43 of the front end wall are disposed in substantially coplanar relationship with a space therebetween which extends from one side of the body to the other. A hollow torque tube type of reinforcing member 44 fills the space between the lower and upper plates 42 and 43 and extends across the front end wall with its opposite ends welded to the upper side plate reinforcing members 45. In general, the plane of the lower and upper front plates 42 and 43 slope outwardly toward the top of the body and that general plane intersects the axial mid-portion of the torque tube reinforcing member, so that a portion of the member extends into the interior of the body and a portion projects forwardly from the exterior surface of the front wall. The reinforcing member 44 is also welded to the adjacent edges of the lower and upper end wall plates 42 and 43.

Further to reinforce the body structure, and to distribute load supporting and draft forces from the torque tube reinforcing member to the side walls of the body, side plates 45 are welded to the interior surfaces of the upper side wall plates and to the end portions of the torque tube reinforcing member. The side plates 45 are relatively heavy and extend about one-third of the way back toward the rear end of the upper side plates from the front wall structure. Also, in the disclosed structure, the side plates 45 are tapered at their upper edges, so that they become narrower toward the rear. Further to reinforce the body structure and to improve the connection between the torque tube reinforcing member and the body side walls, gussets 46 of generally triangular shape longitudinally and also of angular section are welded to the opposite end portions of the torque tube reinforcing member and to the interior surfaces of the plates 45. The gussets 46 are made up of plates 47 and 48 disposed in angular relationship to one another with their adjacent edges welded together and with the vertices of their angles of juncture facing inwardly of the body and axially of the torque tube reinforcing member.

As on the rear and side walls of the body, a channel 49 extends across the upper edge of the front wall from one side to the other of the body above the torque tube reinforcing member and is secured to the upper end wall plate 43 through gussets 50, as well as by being welded to the upper plate 43 with the channel opening downwardly. At the bottom of the lower plate 42, as shown in Fig. 5, that lower plate has a marginal portion 52 bent downwardly in obtuse angular relationship to the plane of the front wall adjacent the bottom opening 27. Externally of the front wall, an angle strip 53 is welded to the edge of the portion 52 and to the exterior surface of the lower plate 42 to provide lateral reinforcement of the bottom of the front wall adjacent the bottom opening.

Internally, and between the front and rear ends, the body is laterally braced between the side walls at the bottom and upper portions of those side walls by tubular cross braces 54 and 55 respectively. The tubular cross brace 54 has its opposite ends welded to reinforcing plates 56 which are in turn welded to the inner surfaces of the lower side plates near the bottom and at the longitudinal mid-portion of those lower side plates. In like manner, the upper cross brace 55 has its opposite ends welded to reinforcing plates 57, which reinforcing plates are in turn welded to the vertical mid-portions of the opposite upper side plates. In the disclosed structure, the upper tubular cross brace 55 is located somewhat to the rear of the lower tubular cross brace 54.

As shown in Figs. 2, 3 and 5, the gooseneck supporting and draft structure is of hollow boxlike section, and is made up of a top plate 58, a bottom plate 59 and opposed side plates 60, with the side plates 60 in spaced and opposed relationship and interposed between the top and bottom plates, the side plates being welded along their opposite edges to the top and bottom plates. The top, bottom and side plates of the gooseneck are shaped so that in plan the gooseneck is relatively narrow at the front and tapers outwardly to a broader section at the rear, the taper being substantially symmetrical with respect to a longitudinal central plane. Also, as viewed from the side, the gooseneck curves downwardly toward the front and away from the front wall of the body. At its forward end, a cast bearing block 62 is welded to the top, side and bottom plates of the gooseneck to provide part of a swivel connection between the trailer and a suitable tractor.

For securing the gooseneck 14 to the body of the trailer, as shown in Fig. 5, the rear end portion of the top plate 58 extends through a slot in the upper front plate 43 and engages the upper surface of the torque tube reinforcing member 44 in substantially tangential relationship thereto. The rear edge of the top plate 58 of the gooseneck structure is welded to the torque tube reinforcing member, and a welded seam is also provided between the upper plate 58 of the gooseneck and the upper front plate 43 of the end wall adjacent the slot through which the plate extends. The bottom plate 59 of the gooseneck has somewhat greater degree of curvature than the top plate 58 and the rear end portion of that plate terminates in substantially tangential relationship to the lower plate 42 of the front wall. The rear end of the lower plate 59 of the gooseneck is welded to that lower plate 42 of the front end wall.

For additionally reinforcing the connection between the gooseneck structure and the body, gussets 63 of angular section extend diagonally across the corners between the opposite side plates 60 of the gooseneck and the torque tube reinforcing member 44. Each of the gussets is made up of plates 64 disposed in angular relationship to one another with the vertices of the angles projecting forwardly of the gooseneck, and with the plates shaped at their opposite ends to fit into the corner in each instance, the plates of the gussets are welded to the side plates of the gooseneck and to the torque tube reinforcing member by substantially continuous welded seams.

The doors 20 and 22 which normally close the bottom opening 27 of the body are similar in structure. As depicted in Fig. 4, each door is composed of a relatively flat plate which extends practically half way across the opening 27 laterally of the body and also extends the full length of the bottom opening. An angle strip 67 is welded to the exterior surface of the plate 66 adjacent the edge which is remote from the side wall of the body and extends longitudinally of the door for substantially its full length. That angle strip 67 projects outwardly from the exterior surface of the door and has a flange 68 projecting outwardly toward the side of the door in spaced relationship to the exterior surface of the plate 66. A plate 69 extends along the angle 67 and is welded to the flange 68 and to the outer surface of the plate 66 to afford a longitudinal reinforcement of closed hollow section. Also, a curved strip 70 is welded to the exterior of the plate 69 and to a projecting end portion of the flange 68 to provide a hollow housing extending longitudinally of the door for accommodating a door actuating cable 72 which extends therethrough. For rigidifying the door plate 66, angle strips 73 are welded to the exterior surface in spaced relationship with the angles facing the door plate to form reinforcing ribs of hollow section.

In order to provide adequate freedom for door movements in dumping and closing operations, the hinge devices 23 and 24 which are utilized to support the outer edges of the doors relative to the side walls have links 74 supported for swinging movement relative to brackets 75 through connecting pins 76, the brackets 75 being welded to the interior surfaces of the lower side plates of the body. The opposite ends of the links 74 are movably connected through cross pins 77 to brackets 78 which are welded to the inner surfaces of the door plates.

As illustrated in Figs. 6, 7, 8 and 9, control of the opening and closing movements of the doors 20 and 22 is effected by a cable mechanism actuated by a hydraulic ram 79. At the rear end of the body, the mid-portion of the cable 72 is anchored to an angle strip 80 by a cable clamp 82 which is secured to that angle strip, the angle strip being welded to the exterior of the rear end plate 37 and extending laterally thereof adjacent the bottom opening. Portions 72a and 72b of the cable on opposite sides of the anchored mid-portion extend over sheaves 83 and 84 respectively which are supported for rotation by brackets 85 and 86 respectively secured to the rear ends of the doors 20 and 22. From the sheaves 83 and 84, the cable portions 72a and 72b extend through the housings 70 longitudinally of the doors and then over similarly supported sheaves 87 and 88 carried by brackets 89 and 90 secured to the front ends of the doors. From the sheaves 87 and 88, the cable portions 72a and 72b extend upwardly at the lower portion of the front end of the body and over pulleys 92 and 93 respectively which are supported for rotation on the angle strip 53 at the front end of the body. The cable portions 72a and 72b then extend laterally of the body to one side thereof and around pulleys 94 and 95 respectively which are supported at the rear end of the hydraulic ram 79 adjacent the front corner of one side of the body. A guide pulley 96 supported for rotation on the angle strip 53 at the front of the body is utilized to change the spacing between the cable portions for alignment with the pulleys 94 and 95. From the pulleys 94 and 95 the portions 72a and 72b of the cables extend around pulleys 97 and 98 which are rotatably supported in spaced relationship on a movable piston rod of the hydraulic ram 79 and returned to a position adjacent the end of a cylinder 100 of the ram 79, where they are secured to anchor blocks 102 and 103 respectively.

When the piston rod 99 of the ram 79 is extended, the portions 72a and 72b of the cable are drawn away from the cable clamp 82 to move the doors 20 and 22 to their closed positions. When the piston rod 99 is retracted, however, the portions 72a and 72b of the cable are released from their stressed positions and the doors drop downwardly to their open positions for dumping.

In order to facilitate the holding of the doors in their closed positions without maintaining fluid pressure in the ram 79, a ratchet 104 is provided on the extending end of the piston rod 99, which ratchet is engageable with a pawl 105 mounted on the exterior of the adjacent side of the body. When the ratchet is engaged by the pawl 105, the doors 20 and 22 are held in their closed positions. However, when the ratchet is released while there is no fluid pressure maintained in the cylinder of the hydraulic ram, the doors quickly drop by gravity to their dumping positions. For remotely controlling the ratchet and pawl mechanism, the disclosed structure, as indicated in Fig. 9, includes a bellcrank 106 carried for swinging movement on the adjacent side of the trailer body and having one end connected to the pawl 105. The other end of the bellcrank 106 is connected to a movable element 108 of a diaphragm type of fluid operated device 107. Thus, the control of fluid pressure to the diaphragm operated device 107 controls the action of the pawl 105 and thereby serves to release the doors for dumping.

The rear axle structure of my disclosed trailer, as shown in Figs. 2 and 3, includes a fabricated cross member 109 of rectangular section and made from plate stock, which cross member has castings 110 in its opposite ends that are machined to receive and support stub axles 112 upon which the wheels 12 and 13 are rotatably mounted. Opposite end portions of the fabricated cross member 109 are secured to fabricated box type structures 113 made of plate stock and extending rearwardly from opposite sides of the exterior of the rear end plate 37 of the body, those fabricated box type structures 113 being welded to the rear end plate of the body. Above the wheels 12 and 13, fabricated and somewhat prism shaped shields 114 are secured to the body end plate 37 and extend rearwardly to prevent material from falling from the body or from a loading shovel into the axle mechanism. Also, a rear bumper bar 115 is supported from the body somewhat rearwardly of the wheels 12 and 13 and between the wheels by parallel and relatively horizontal supporting beams 116 and additional braces 117 which are disposed in acute angular relationship to the beams 116, the rear ends of the beams and braces being secured to the bumper bar 115 and the forward ends of those parts being welded to the rear axle structure and the rear end plate of the body.

From the foregoing description and reference to the accompanying drawings, it may be observed that I have provided a trailer structure which does not embody any underframe, as such, and in which the structure and arrangement of the body parts, with added reinforcing elements, provide a rugged, rigid and relatively lightweight hopper type body adapted to the carrying of large loads with facilities for bottom dumping. With my disclosed gooseneck supporting and draft structure and the structure by which it is attached to the body through a torque tube reinforcing member and associated force distributing parts, the stresses encountered in operation are well distributed through the body structure, and the body is made rigid without the aid of heavy supporting framework.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a load hauling trailer structure, the combination comprising a body having front, rear and side walls secured together at their ends to define a hopper of substantially rectangular shape, and a bottom including a pair of doors hinged to the lower portions of the side walls for swinging movements between open and closed positions, said front wall of the body having upper and lower sheet metal portions secured to opposite axially extending side wall portions of a tubular metal torque member which is substantially coextensive laterally of the end with the upper and lower sheet metal portions, a reinforcing plate secured to each side wall adjacent opposite ends of the tubular torque member and extending rearwardly of each side wall from that member, said reinforcing plates having their forward ends secured to the tubular torque member so that they distribute stresses to the side walls, a goose-neck draft member secured to the longitudinal mid-portion of the tubular torque member and extending forwardly of the body, and wheels mounted on the rear of the body.

2. In a load hauling trailer structure as defined in claim 1, the combination being further characterized by fabricated sheet metal gussets of substantially V-shaped section secured to and extending between the tubular torque member and each of the reinforcing plates, and additional fabricated gussets of similar structure secured to and extending between opposite sides of the goose-neck draft member and tubular torque member.

3. In a load hauling trailer structure as defined in claim 1, said goose-neck draft member being farbricated of sheet metal in a box-type section including side, top and bottom walls, said top wall of the goose-neck draft member extending through a slot in the upper portion of the front wall of the body and terminating in substantially tangential contact with the tubular torque member and being secured to both the top portion of the front wall of the body and to the tubular torque member, and the bottom wall of the goose-neck draft member being curved to make surface contact with the lower sheet metal portion of the front wall of the body and being secured thereto.

4. In a load hauling trailer structure as defined in claim 1, the combination being further characterized by two tubular trusses extending laterally of the mid-portion of the interior of the body at positions spaced longitudinally and vertically of the body from one another, and said trusses having their opposite ends secured to the side walls of the body.

5. In a load hauling trailer structure as defined in claim 1, said end walls diverging upwardly relative to one another, said side walls having substantially vertical and parallel upper portions which diminish in height from the front wall to the rear wall of the body, and said side walls also have lower portions which converge inwardly from the upper portions thereof toward the bottom in obtuse angular relationship to the respective upper portions.

6. In a load hauling trailer structure, the combination comprising a body having front, rear and side walls and a bottom which together define a load carrying receptacle, said front wall having upper and lower portions divided by a tubular member secured to both portions and extending laterally thereof between the portions, side reinforcing plates secured to the tubular member and the side walls and covering substantial portions of the side walls for distributing stresses from the tubular member to the side walls, wheels mounted at the rear of the body, and a goose-neck draft member secured to the longitudinal mid-portion of the tubular member and extending forwardly from the body.

7. In a load hauling trailer structure as defined in claim 6, and further characterized by gussets of substantially V-shaped section fabricated of sheet metal and secured to and extending between the tubular member and both the side walls and between the tubular member and the goose-neck draft member, said gussets extending longitudinally of the tubular member and longitudinally of the goose-neck draft member and the side walls.

8. In a load hauling trailer structure as defined in claim 6, said goose-neck draft member having side, top and bottom walls, said side and top walls of the goose-neck draft member being secured to the tubular member, and said bottom wall of the draft member being secured to the lower portion of the front wall of the body.

9. In a load hauling trailer structure as defined in claim 6, said side walls of the body having upper portions which diminish in height from the front wall to the rear wall of the body, and said side walls also having lower portions which converge inwardly in obtuse angular relationship to the respective upper portions and toward the bottom.

10. In a load hauling trailer structure, the combination comprising a body having front, rear and side walls and a bottom which together define a load carrying receptacle, said front wall having upper and lower portions divided by a tubular member secured to both portions and extending laterally thereof between the portions, wheels mounted at the rear of the body, and a gooseneck draft member secured to the longitudinal midportion of the tubular member and extending forwardly from the body.

11. In a load hauling trailer structure as defined in claim 10, the combination being further characterized by two tubular trusses extending laterally of the midportion of the interior of the body and secured to the side walls, said trusses being located at positions spaced longitudinally and vertically of the body from one another.

12. In a load hauling trailer structure, the combination comprising a body including a front wall, a tubular member extending laterally of the mid-portion of the front wall and secured thereto so that it extends internally and externally of the adjacent wall portions, a goose-neck draft member having top, side and bottom walls, said top and side walls of the draft member being secured to the tubular member, and said bottom wall of the draft member being secured to the front wall of the body at a position spaced from the tubular member.

13. In a load hauling trailer structure as defined in claim 12, said body having side walls secured to and extending in angular relationship from the front wall, and parts secured to the side walls and to opposite end portions of the tubular member for distributing stresses from the tubular member to substantial portions of the side walls.

14. In a load hauling trailer structure, the combination comprising a body including a front wall, side and end walls and a bottom secured together, a tubular member extending laterally of the mid-portion of the front wall and secured thereto so that it extends internally and externally of the front wall and a goose-neck draft member secured to the tubular member and extending forwardly of the body from the front wall.

References Cited in the file of this patent

UNITED STATES PATENTS

| | | |
|---|---|---|
| 1,168,689 | Underhill | Jan. 18, 1916 |
| 2,322,437 | Gustafson | June 22, 1943 |